US010051577B2

(12) United States Patent
Tanaka (10) Patent No.: US 10,051,577 B2
(45) Date of Patent: Aug. 14, 2018

(54) COMMUNICATION APPARATUS, CONTROL METHOD, AND STORAGE MEDIUM (71) Applicant: CANON KABUSHIKI KAISHA, Tokyo (JP)

(72) Inventor: Yu Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/733,151

(22) Filed: Jun. 8, 2015

(65) Prior Publication Data

US 2015/0365990 A1 Dec. 17, 2015

(30) Foreign Application Priority Data

Jun. 13, 2014 (JP) .................. 2014-122740

(51) Int. Cl.
H04W 4/00 (2018.01)
H04W 52/02 (2009.01)
H04W 8/00 (2009.01)
H04W 4/80 (2018.01)
H04W 84/18 (2009.01)

(52) U.S. Cl.
CPC ....... *H04W 52/0235* (2013.01); *H04W 4/008* (2013.01); *H04W 4/80* (2018.02); *H04W 8/005* (2013.01); *H04W 84/18* (2013.01); *Y02B 60/50* (2013.01); *Y02D 70/00* (2018.01)

(58) Field of Classification Search
CPC .................................... H04W 4/008
USPC ..................... 455/41.1, 41.2, 41.3
See application file for complete search history.

(56) References Cited

U.S. PATENT DOCUMENTS

| 8,824,961 | B2* | 9/2014 | Royston | G06K 7/10138 455/101 |
| 2004/0116074 | A1* | 6/2004 | Fujii | G06K 7/0008 455/41.2 |
| 2007/0142003 | A1* | 6/2007 | Posamentier | H01Q 1/362 455/114.3 |
| 2008/0130603 | A1* | 6/2008 | Wentink | H04W 74/085 370/338 |
| 2011/0090063 | A1* | 4/2011 | Koons | G06K 7/10009 340/10.33 |
| 2011/0131334 | A1* | 6/2011 | Takasu | H04W 76/02 709/227 |
| 2012/0309302 | A1* | 12/2012 | Buhot | G06K 7/10237 455/41.1 |
| 2013/0005248 | A1* | 1/2013 | Wilson | G06K 7/10217 455/41.1 |
| 2014/0073240 | A1* | 3/2014 | Gree | H04W 52/0216 455/41.1 |

(Continued)

FOREIGN PATENT DOCUMENTS

| JP | 2011-054093 A | 3/2011 |
| JP | 2013-077973 A | 4/2013 |

*Primary Examiner* — Wen Huang
(74) *Attorney, Agent, or Firm* — Carter, DeLuca, Farrell & Schmidt, LLP (57) ABSTRACT A communication apparatus detects a communication partner apparatus and transmits a first signal. Then, in the case where the partner apparatus is detected and a response to the transmitted first signal has not been received from the partner apparatus, the communication apparatus transmits a second signal having a higher power level than the first signal.

15 Claims, 7 Drawing Sheets (56) References Cited

U.S. PATENT DOCUMENTS

| | | | | |
|---|---|---|---|---|
| 2014/0087655 | A1* | 3/2014 | Hall | H04B 5/0075 |
| | | | | 455/41.1 |
| 2014/0194057 | A1* | 7/2014 | Shana'a | H04W 52/0241 |
| | | | | 455/41.1 |
| 2014/0304094 | A1* | 10/2014 | Reddy | G02B 6/0073 |
| | | | | 705/17 |
| 2015/0018643 | A1* | 1/2015 | Cole | A61B 5/0015 |
| | | | | 600/316 |
| 2015/0334650 | A1* | 11/2015 | Park | H04W 84/12 |
| | | | | 370/311 |

* cited by examiner

COMMUNICATION APPARATUS, CONTROL METHOD, AND STORAGE MEDIUM

BACKGROUND OF THE INVENTION

Field of the Invention

The present invention relates to controlling the activation of a communication apparatus.

Description of the Related Art

In a close-proximity wireless communication system exemplified by NFC (Near Field Communication), communication is typically carried out between an initiator, called a "reader/writer", and a target, called a "tag". In an electromagnetic field having a specific frequency, the initiator transmits a modulated signal to the target, and based on the received signal, the target transmits a modulated signal to the initiator.

Communication apparatuses that serve as targets are classified into active types that include an internal power supply for operation, and passive types that do not include an internal power supply and instead obtain operational power for the target itself from the signal received from the initiator. Based on this principle of operation, when the electromagnetic field generated by the initiator is weak, a passive type communication apparatus cannot obtain operational power and thus cannot be activated. Meanwhile, although an active type communication apparatus does not depend on the electromagnetic field generated by the initiator, a system that puts the internal power supply and so on into a suspended state when the apparatus is not communicating is typically used in order to conserve power during long-term operation of the apparatus. When, in the suspended state, the active type communication apparatus receives a signal from an initiator, the internal power supply is activated using the received signal in a manner similar to the passive type and the apparatus supplies its own power. As such, an active type communication apparatus cannot activate the internal power supply when the electromagnetic field generated by the initiator is weak.

In response to this issue, Japanese Patent Laid-Open No. 2011-054093 discloses a method in which an initiator-side communication apparatus initially transmits a signal at a maximum transmission power and a target-side communication apparatus activates an internal power supply upon detecting that signal from the initiator.

However, according to the method disclosed in Japanese Patent Laid-Open No. 2011-054093, the initiator-side communication apparatus carries out a process for transmitting the signal at the maximum transmission power regardless of whether or not the target-side communication apparatus is present, and thus a certain amount of time and processing have been necessary until the actual start of communication.

Having been achieved in light of such problems, the present invention provides a technique for activating a communication partner apparatus while reducing processing carried out up until communication is started.

SUMMARY OF THE INVENTION

According to one aspect of the present invention, there is provided a communication apparatus comprising: a detection unit configured to detect a communication partner apparatus; and a communication unit configured to transmit a first signal for communication and, in the case where the partner apparatus is detected and a response to the first signal has not been received from the partner apparatus, transmit a second signal having a higher power level than the first signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will now be described in detail with reference to the drawings. It should be noted that the relative arrangement of the components, the numerical expressions, and numerical values set forth in the embodiments do not limit the scope of the present invention unless it is specifically stated otherwise.

Figure 1:
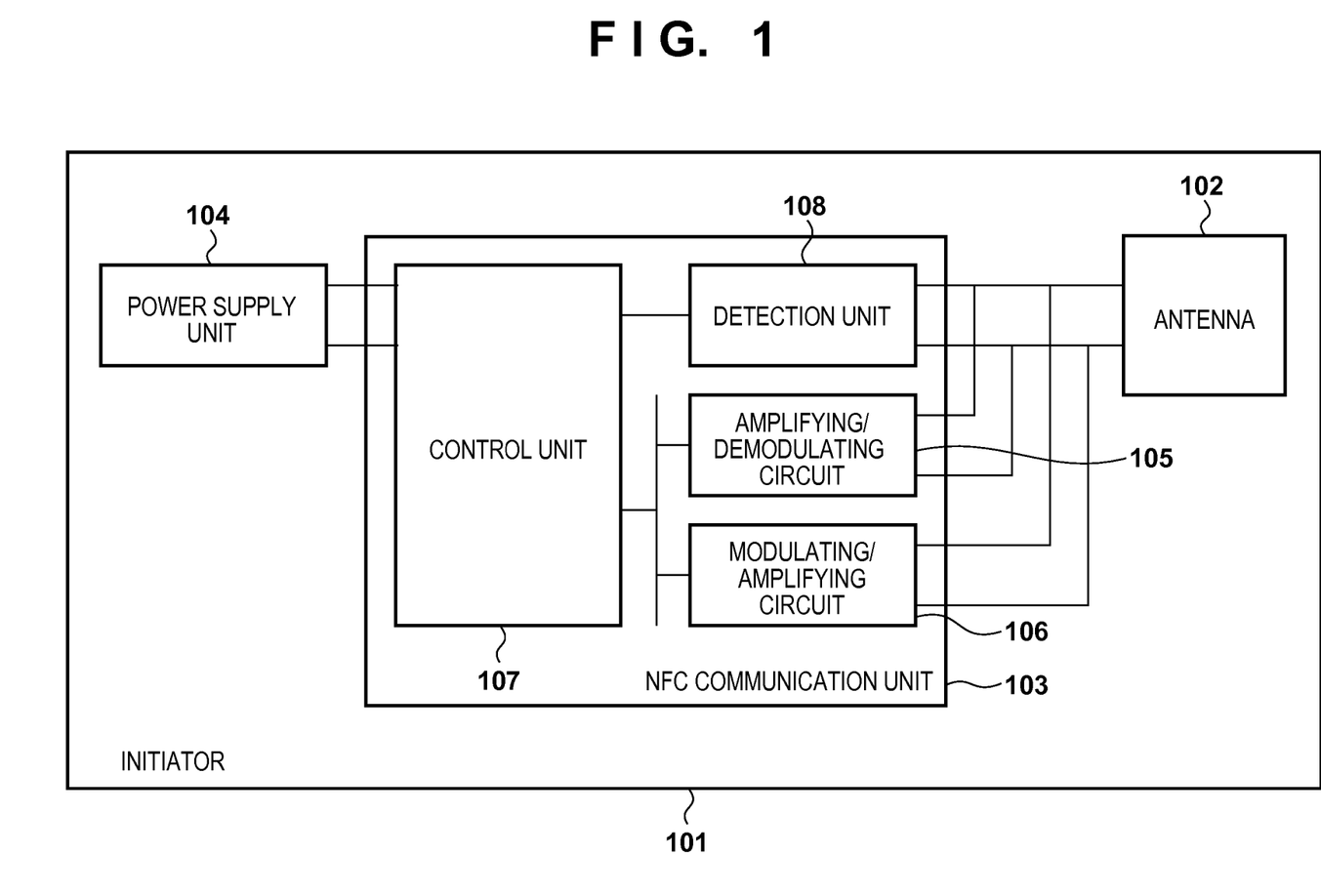
FIG. 1 is a diagram illustrating an example of the configuration of a communication apparatus (initiator).
Figure 2:
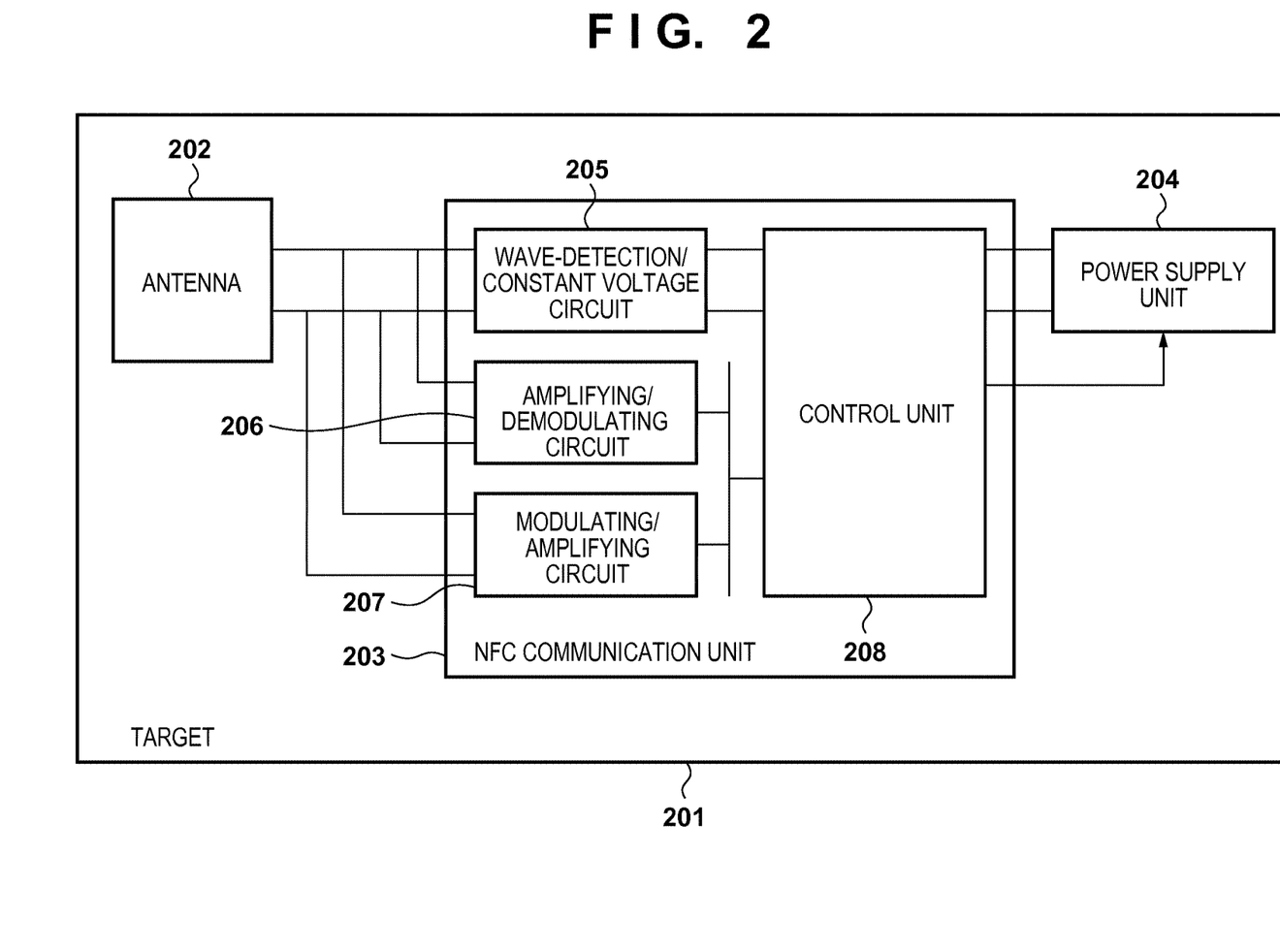
FIG. 2 is a diagram illustrating an example of the configuration of a partner apparatus (target).

FIG. 1 illustrates the configuration of a communication apparatus (an NFC (Near Field Communication) initiator 101) according to a first embodiment, and FIG. 2 illustrates the configuration of a partner apparatus (an NFC target 201) in communication with the initiator 101 according to the first embodiment. In the present embodiment, the target 201 is activated by an electromagnetic field generated by the initiator 101. At that time, in the case where the initiator 101 has detected the target 201 but cannot activate the target 201 using a first signal for communication output by the initiator 101 (a polling signal, for example), the initiator 101 sends a second signal for activation. On the other hand, in the case where the target 201 can be activated by the first signal for communication output by the initiator 101, the initiator 101 starts communication directly, without transmitting the second signal. Accordingly, the initiator 101 can activate the target 201 with certainty while reducing the amount of processing carried out up until the start of communication. Note that the target 201 transitioning from a suspended state, which is a power-saving state in which the target 201 cannot actively transmit signals, to an operational state in which the target 201 can actively transmit signals, will be referred to as "activation" hereinafter. In other words, the target 201 can transition to the suspended state, which does not turn the power off but does conserve power.

Apparatus Configuration

The initiator 101 includes an antenna 102 that generates an electromagnetic field enabling signals near 13.56 MHz, for example, to be transmitted, and detects an electromagnetic field generated by another apparatus and thereby receives signals near 13.56 MHz, or both, an NFC communication unit 103, and a power supply unit 104 that supplies power to the NFC communication unit 103. Meanwhile, the NFC communication unit 103 includes an amplifying/demodulating circuit 105, a modulating/amplifying circuit 106, and a detection unit 108 connected to the antenna 102, and a control unit 107 connected to the power supply unit 104. The detection unit 108 detects whether a partner apparatus (the target 201) is present within a communication-capable range of the initiator 101 by, for example, detecting changes in an impedance of the antenna 102.

The control unit 107 causes the antenna 102 to send a signal modulated and amplified by controlling the modulating/amplifying circuit 106, and controls the amplifying/demodulating circuit 105 to amplify and demodulate the modulated signal received from the antenna 102. Through this, the control unit 107 can transmit a signal to or receive a signal from the communication partner apparatus. Meanwhile, in the case where, for example, the detection unit 108 has detected that the partner apparatus is present in the vicinity based on changes in the impedance, the control unit 107 carries out control for activating the partner apparatus by controlling the amplifying/demodulating circuit 105 and the modulating/amplifying circuit 106. For example, the control unit 107 determines whether the detection unit 108 has detected the presence of the partner apparatus and the amplifying/demodulating circuit 105 has received, from the partner apparatus, a response to the first signal for communication transmitted by the modulating/amplifying circuit 106. In the case where the control unit 107 has determined that the response has not been received, the control unit 107 controls the modulating/amplifying circuit 106 to transmit the second signal, which is different from the first signal.

The target 201 includes an antenna 202 that generates an electromagnetic field enabling signals near 13.56 MHz, for example, to be transmitted, and detects an electromagnetic field generated by another apparatus and thereby receives signals near 13.56 MHz, or both, an NFC communication unit 203, and a power supply unit 204 that supplies power to the NFC communication unit 203. Meanwhile, the NFC communication unit 203 includes a wave-detection/constant voltage circuit 205, an amplifying/demodulating circuit 206, and a modulating/amplifying circuit 207 connected to the antenna 202, and a control unit 208 connected to the power supply unit 204.

The wave-detection/constant voltage circuit 205 performs wave-detection on the signal received from the antenna 202 and outputs a wave-detection signal to the control unit 208. The control unit 208 controls the amplifying/demodulating circuit 206 to amplify and demodulate a modulated signal received via the antenna 202 and controls the modulating/amplifying circuit 207 to transmit a load-modulated signal. The control unit 208 also receives the wave-detection signal from the wave-detection/constant voltage circuit 205 and outputs a trigger signal to the power supply unit 204. Note that the wave-detection signal output by the wave-detection/constant voltage circuit 205 may have any magnitude as long as the magnitude enables the control unit 208 to output the trigger signal, and does not need to be a magnitude required by the control unit 208 for transmitting/receiving modulated/demodulated signals. In other words, an operating voltage required by the control unit 208 to output the trigger signal may be different from an operating voltage required to transmit/receive modulated/demodulated signals.

The power supply unit 204 can enter a suspended state in which power is not supplied to the NFC communication unit 203, and during the suspended state, the target 201 cannot actively transmit signals to the initiator 101. When in the suspended state, the power supply unit 204 enters an operational state upon receiving the trigger signal from the control unit 208 and starts supplying power to the NFC communication unit 203. Whether to use the wave-detection/constant voltage circuit 205 or the power supply unit 204 as a power supply source may also be made selectable as desired after the target 201 has been activated. This makes it possible to stabilize the operation of the target 201.

Although the stated initiator 101 and target 201 have amplifying/demodulating circuits and modulating/amplifying circuits, the function of an amplifier, the function of a demodulator, and the function of a modulator may be provided individually.

Operations

Figure 3:
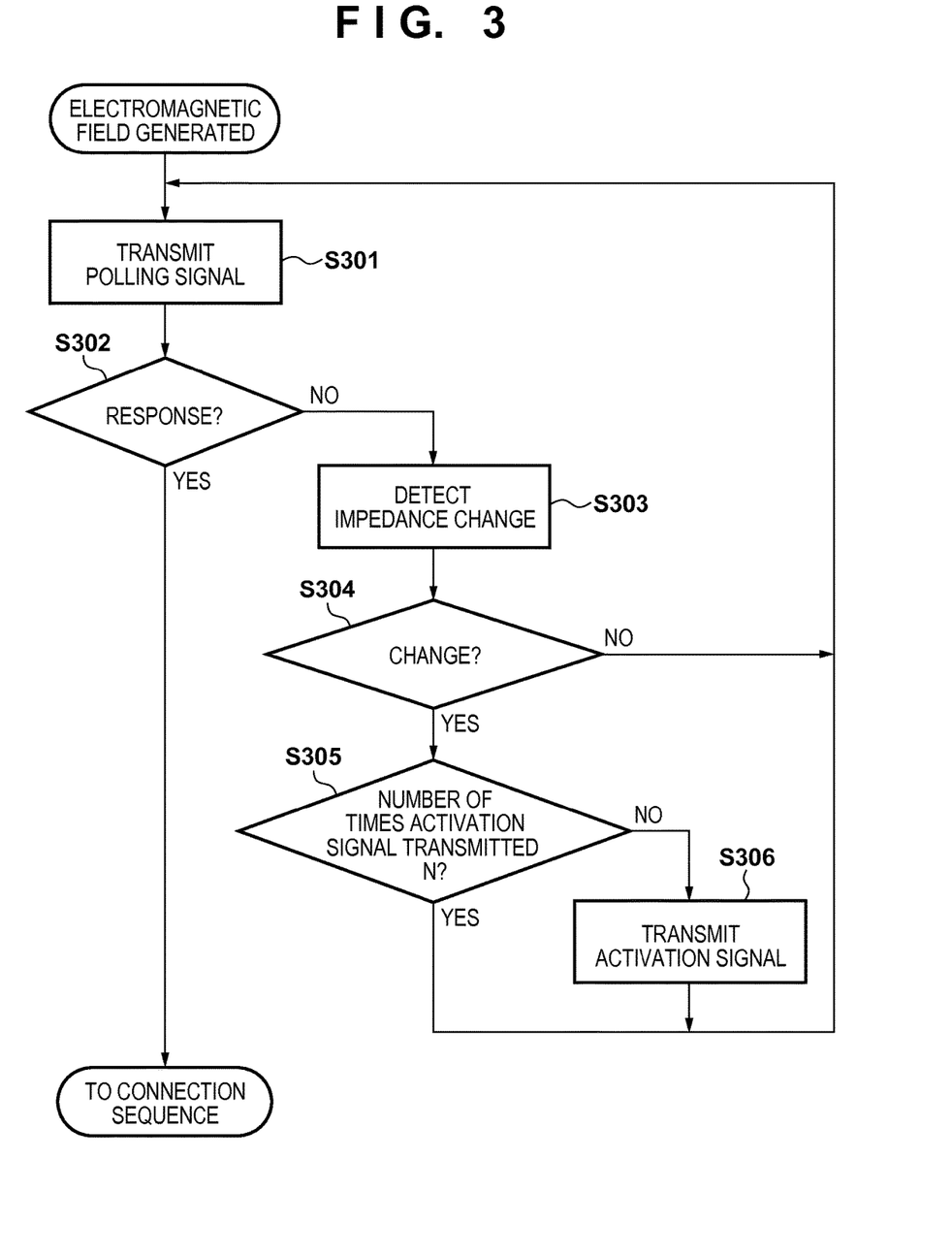
FIG. 3 is a flowchart illustrating a first example of processing executed by the initiator.

Next, processing executed by the initiator 101 will be described using FIG. 3.

The initiator 101 generates an electromagnetic field in response to the apparatus being activated or a user operation, cyclically outputs a target search polling signal having a set length (S301), and determines whether a response to that signal has been received from the target 201 (S302). Upon determining that there has been a response (YES in S302), the initiator 101 executes a connection sequence with the target 201 that responded. Note that the connection sequence and the processing that follows thereafter is carried out through a normal NFC communication procedure, and thus descriptions thereof will be omitted here.

On the other hand, upon determining that there has not been a response (NO in S302), the initiator 101 uses the detection unit 108 to execute a process for detecting a change in the impedance of the antenna 102 in order to determine whether the target 201 is in the vicinity (S303). In other words, the initiator 101 determines whether a partner apparatus is present in the vicinity. Note that whether the partner apparatus is present in the vicinity may be determined based on moving object detection, a change in a current related to the antenna, or the like instead of based on a change in the impedance. The initiator 101 then determines whether the impedance has changed (S304).

In the case where the initiator 101 has determined that the impedance has changed (YES in S304), the initiator 101 then determines whether a number of times an activation signal, which will be mentioned later, has been transmitted has reached a predetermined number (N times) (S305). In the case where the number of times the activation signal has been transmitted has not reached the predetermined number (NO in S305), the initiator 101 transmits the activation signal so that the control unit 208 of the target 201 can output the trigger signal, or in other words, in order to activate the target 201 (S306). On the other hand, in the case where the initiator 101 has determined that the impedance has not changed (NO in S304), or in the case where the number of times the activation signal has been transmitted has reached the predetermined number (YES in S305), the activation signal is not transmitted (or retransmitted). Through this, the initiator 101 can stop the activation signal from being retransmitted and prevent the activation signal from continuing to be needlessly retransmitted in the case where the impedance has changed due to an object that is not the target 201 having approached the initiator 101 or the like. Note that the initiator 101 may stop the polling signal transmission in S301 after a specified number of transmissions, a specified amount of time, or the like.

Figure 4:
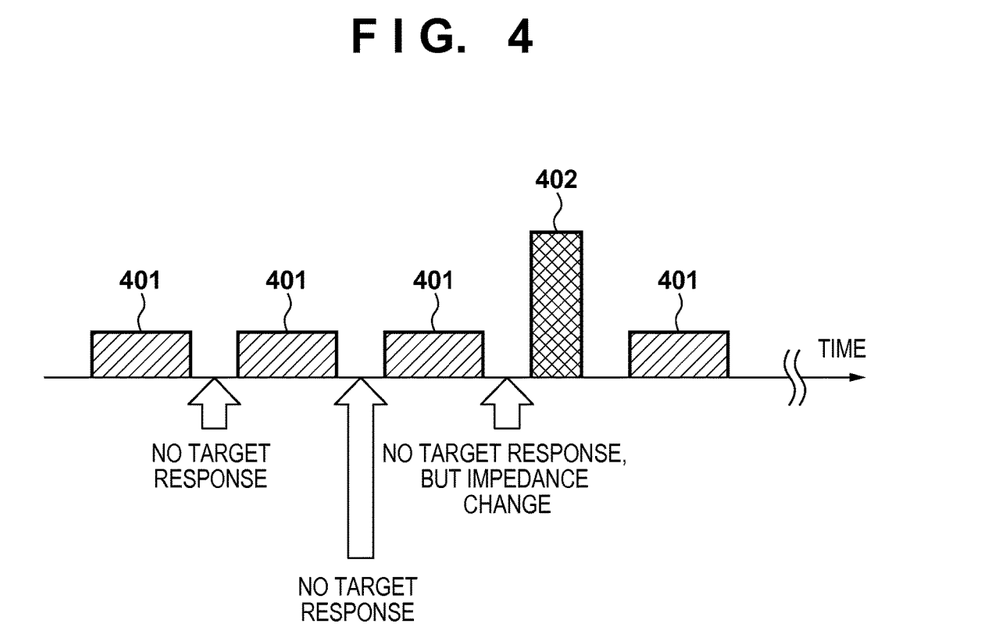
FIG. 4 is a conceptual diagram illustrating a first example of a signal output by the initiator.

FIG. 4 illustrates an example of signals transmitted by the initiator 101 according to the present embodiment. Note that in FIG. 4, the horizontal axis represents time and the vertical axis represents the magnitude (amplitude/power) of the signal. FIG. 4 illustrates a state in which the initiator 101 detects a change in the impedance after outputting a polling signal 401 three consecutive times, and then outputs an activation signal 402. The target 201 is activated by the activation signal 402, and the initiator 101 can then receive a response to the next polling signal 401 from the target 201. As a result, the initiator 101 can advance the connection sequence with the target 201.

Figure 7:
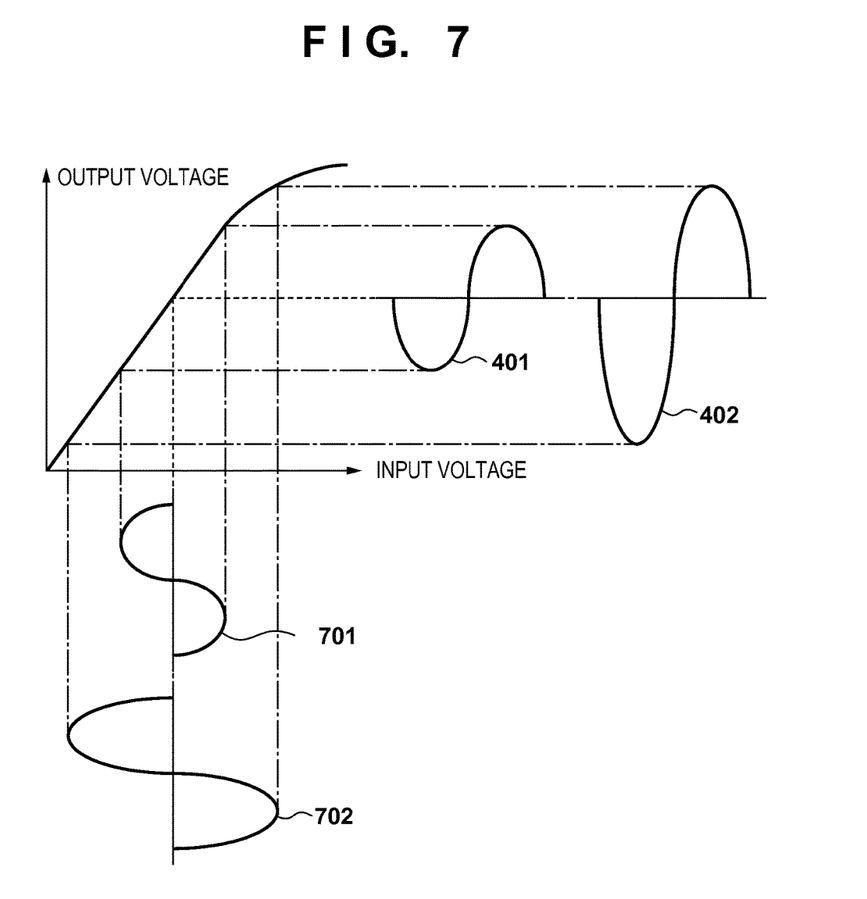
FIG. 7 is a diagram illustrating a relationship between an input signal and an output signal in a linear region and a non-linear region of an amplifier.

Unlike, for example, the polling signal, which must be demodulated by the target 201, the activation signal 402 is a signal that does not need to be demodulated by the target 201. As such, the modulating/amplifying circuit 106 may use a non-linear region of an amplifier and output a signal at a greater amplitude than the polling signal 401, as indicated in FIG. 7. By doing so, the target 201 can be activated with certainty even in the case where, due to functional limitations, the initiator 101 cannot generate an electromagnetic field sufficient for the control unit 208 of the target 201 to output the trigger signal. For example, even in the case where the initiator 101 is transmitting the polling signal 401 at a sufficiently high power level, the initiator 101 can send the activation signal 402 at an even higher amplitude (power). The target 201 can then be activated by receiving a signal of no less than a predetermined power (amplitude). Note that the stated effects can be achieved simply adding a high-distortion, low-cost amplifier to a communication apparatus that functions as an initiator, regardless of the configuration of that initiator.

Meanwhile, rather than simply having a higher amplitude, the activation signal 402 may be a signal defined by a predetermined pattern. In this case, the target 201 can use the reception of a signal having this pattern as a condition for outputting the trigger signal. Meanwhile, the received signal having a magnitude greater than a threshold and being a signal that cannot be demodulated may be used by the target 201 as conditions for outputting the trigger signal. As a result, a case where the initiator 101 has transmitted the activation signal 402 can be determined with certainty and activation control can be carried out efficiently.

Although the first embodiment describes the initiator 101 as determining that the impedance of the antenna has changed in the case where there is no response to the polling signal, in a second embodiment, it is first determined whether the impedance has changed. Then, the initiator 101 transmits the polling signal in the case where the impedance has changed and the possibility that the target 201, which is the partner apparatus, is present has been detected. This prevents wasteful transmission of the polling signal.

Apparatus Configuration

The configurations of the initiator 101 and the target 201 according to the present embodiment are the same as in the first embodiment, and thus detailed descriptions thereof will be omitted.

Operations

Figure 5:
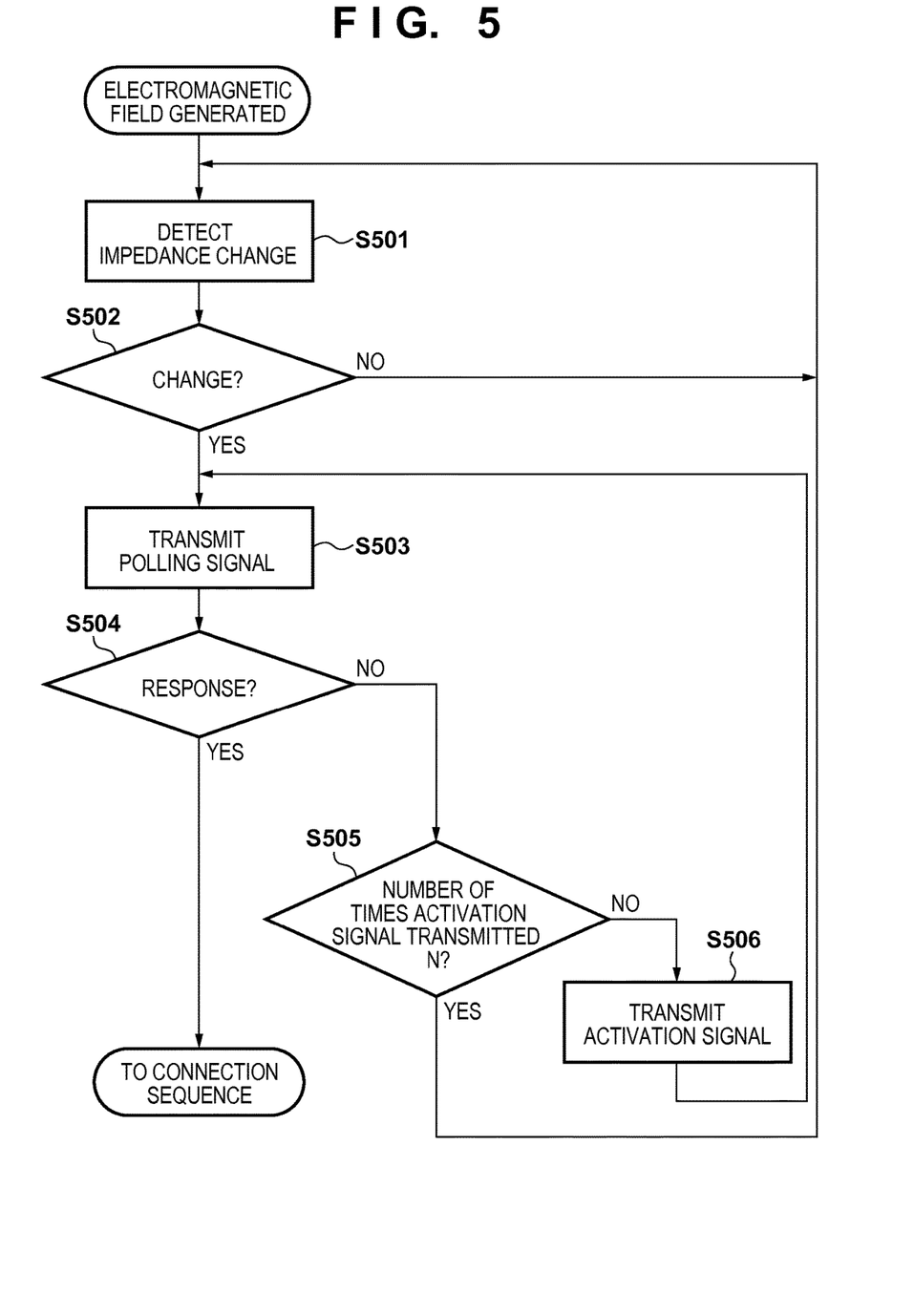
FIG. 5 is a flowchart illustrating a second example of processing executed by the initiator.

Processing executed by the initiator 101 according to the present embodiment will be described using FIG. 5.

The initiator 101 generates an electromagnetic field in response to the apparatus being activated or a user operation, and uses the detection unit 108 to detect a change in the impedance of the antenna 102 in order to determine whether the target 201 is in the vicinity (S501). The initiator 101 then determines whether the impedance has changed (S502). In the case where the initiator 101 has determined that the impedance has not changed (NO in S502), the initiator 101 continues to monitor for changes in the impedance.

On the other hand, in the case where the initiator 101 has determined that the impedance has changed (YES in S502), the initiator 101 outputs the target search polling signal having a set length (S503). The initiator 101 then determines whether a response to that signal has been received from the target 201 (S504). Upon determining that there has been a response (YES in S504), the initiator 101 executes a connection sequence with the target 201 that responded.

Meanwhile, in the case where the initiator 101 determines that there has been no response (NO in S504), the initiator 101 then determines whether the number of times the activation signal has been transmitted has reached a predetermined number (N times) (S505). In the case where the number of times the activation signal has been transmitted has not reached the predetermined number (NO in S505), the initiator 101 transmits the activation signal so that the control unit 208 of the target 201 can output the trigger signal (S506). On the other hand, in the case where the number of times the activation signal has been transmitted has reached the predetermined number (YES in S505), the initiator 101 does not transmit the activation signal.

Figure 6:
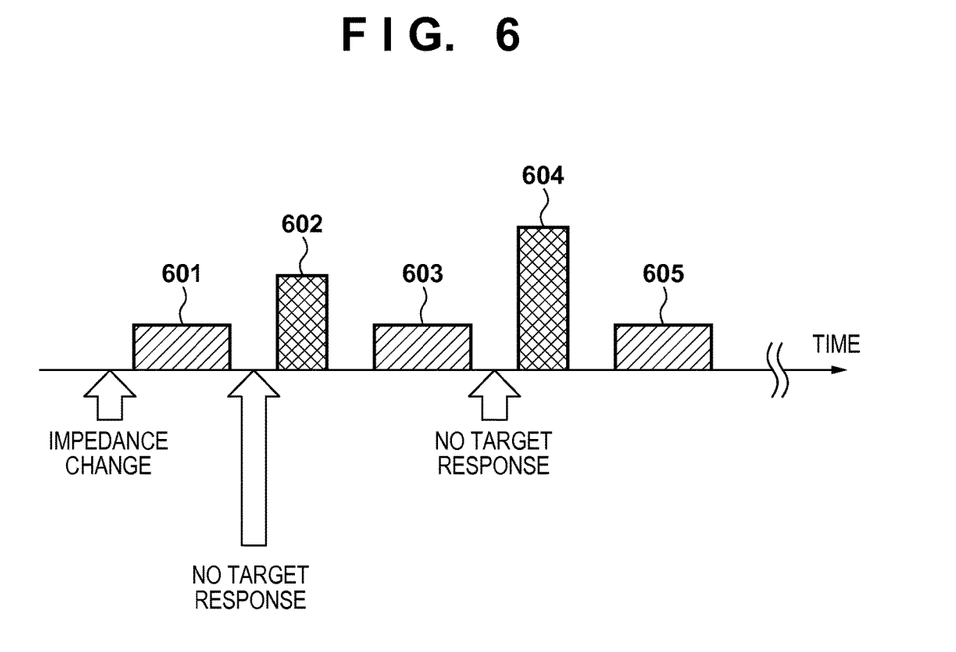
FIG. 6 is a conceptual diagram illustrating a second example of a signal output by the initiator.

FIG. 6 illustrates an example of signals transmitted by the initiator 101 according to the present embodiment. Note that in FIG. 6, the horizontal axis represents time and the vertical axis represents the magnitude (amplitude/power) of the signal. In FIG. 6, the initiator 101 first detects a change in the impedance, and then outputs a polling signal 601. However, because a response to that polling signal 601 could not be received from the target 201, the initiator 101 outputs an activation signal 602. After transmitting the activation signal 602, the initiator 101 transmits a polling signal 603. However, assume that initiator 101 has not received a response from the target 201 to the polling signal 603 as well. In this case, the initiator 101 retransmits an activation signal 604.

Note that at this time, the activation signal 604 has a higher amplitude (power) than, for example, the activation signal 602 output previously, as indicated in FIG. 6. The initiator 101 activates the target 201 by the higher activation signal 604, and when a response to a subsequent polling signal 605 can be received from the target 201, the initiator 101 can advance the connection sequence with the target 201. In this manner, the initiator 101 may set the amplification rate of the activation signal to be variable, and raise the amplitude (power) of the activation signal in stages until the target 201 outputs the trigger signal.

Although the foregoing embodiments describe the two communication apparatuses as being set as either the initiator 101 or the target 201, in NFC, at least, the roles of the initiator 101 and the target 201 as assigned to terminals are not fixed. In other words, the aforementioned embodiments can be applied in the case where a terminal can take on either role with respect to the configurations of the stated initiator 101 and target 201. That is, the initiator 101 and the target 201 may have other functions in addition to the functions described above, and may omit functions described above to an extent that still enables the aforementioned functions to be realized. For example, the initiator 101 and the target 201 can each include a host control unit, a memory, and the like. Furthermore, a terminal that has functions or a circuit configuration that enables both roles to be realized can switch between functioning as the initiator 101 and the target 201 as appropriate. Furthermore, the techniques according to the aforementioned embodiments are not dependent on communication frequencies, communication methods, or the like. As such, the communication method used by the communication apparatuses in the aforementioned embodiments is not limited to NFC, and for example, another contactless wireless communication system such as RFID or wireless power transmission may be used as well.

According to the present invention, a communication partner apparatus can be activated while reducing the amount of processing carried out up until communication is started.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-122740, filed Jun. 13, 2014, which is hereby incorporated by reference herein in its entirety.

What is claimed is:

1. A communication apparatus comprising:
a communication unit configured to perform Near Field Communication;
a detection unit configured to detect a partner apparatus that exists within a communicable range of the communication unit;
a determination unit configured to determine, in the case where the communication unit transmits a first signal, whether or not the communication unit has received a response to the first signal; and
a control unit configured to control, in the case where the partner apparatus is detected by the detection unit and it is determined by the determination unit that the communication unit has not received the response to the first signal, the communication unit to transmit a second signal that has a higher amplitude than the first signal and a higher power than the first signal,
wherein the second signal is a signal that is of a different type from the first signal and is for causing the partner apparatus to transition into a state in which the partner apparatus can respond to the first signal, and
wherein the communication unit performs wireless communication with the partner apparatus in the case where the communication unit has received the response to the first signal from the partner apparatus after transmission of the second signal.

2. The communication apparatus according to claim 1, wherein the second signal is a signal for causing the partner apparatus to transition from a first state that is a power-saving state to a second state in which a greater amount of power is consumed than in the first state.

3. The communication apparatus according to claim 2, wherein the second state is a state in which the partner apparatus can communicate with the communication apparatus.

4. The communication apparatus according to claim 2, wherein the partner apparatus transitions from the first state to the second state in response to receiving a signal having no less than a predetermined power level.

5. The communication apparatus according to claim 2, wherein the partner apparatus transitions from the first state to the second state in response to receiving a signal that cannot be demodulated.

6. The communication apparatus according to claim 1, wherein the second signal is a signal amplified in a non-linear region of an amplifier.

7. The communication apparatus according to claim 1, wherein the detection unit detects the partner apparatus by determining whether or not an impedance of an antenna that carries out communication has changed.

8. The communication apparatus according to claim 1, wherein the detection unit detects the partner apparatus by determining whether or not a current in an antenna used for carrying out communication has changed.

9. The communication apparatus according to claim 1, wherein the control unit controls the communication unit to transmit the first signal after transmitting the second signal, and to retransmit the second signal in the case where the communication unit has not received the response to the first signal from the partner apparatus.

10. The communication apparatus according to claim 9, wherein, when the communication unit retransmits the second signal, the control unit controls the communication unit to increase a power level of the second signal and to retransmit the second signal.

11. The communication apparatus according to claim 9, wherein the control unit controls the communication unit to stop transmitting the second signal in the case where a number of times the second signal has been transmitted has reached a predetermined number.

12. The communication apparatus according to claim 1, wherein in the case where the communication unit has received the response to the first signal from the partner apparatus before transmission of the second signal, the communication unit communicates with the partner apparatus without transmitting the second signal.

13. The communication apparatus according to claim 1, wherein the first signal is a polling signal.

14. A control method for a communication apparatus that comprises a communication unit configured to perform Near Field Communication, the method comprising:
detecting a partner apparatus that exists within a communicable range of the communication unit;

determining, in the case where the communication unit transmits a first signal, whether or not the communication unit has received a response to the first signal; and controlling, in the case where the partner apparatus is detected and it is determined that the communication unit has not received the response to the first signal, the communication unit to transmit a second signal that has a higher amplitude than the first signal and a higher power than the first signal, wherein the second signal is a signal that is of a different type from the first signal and is for causing the partner apparatus to transition into a state in which the partner apparatus can respond to the first signal, and wherein the communication unit performs wireless communication with the partner apparatus in the case where the communication unit has received the response to the first signal from the partner apparatus after transmission of the second signal.

15. A non-transitory computer-readable storage medium storing a computer program that causes a computer in a communication apparatus that comprises a communication unit configured to perform Near Field Communication to:

detect a partner apparatus that exists within a communicable range of the communication unit;

determine, in the case where the communication unit transmits a first signal, whether or not the communication unit has received a response to the first signal; and control, in the case where the partner apparatus is detected and it is determined that the communication unit has not received the response to the first signal, the communication unit to transmit a second signal that has a higher amplitude than the first signal and a higher power than the first signal, wherein the second signal is a signal that is of a different type from the first signal and is for causing the partner apparatus to transition into a state in which the partner apparatus can respond to the first signal, and wherein the communication unit performs wireless communication with the partner apparatus in the case where the communication unit has received the response to the first signal from the partner apparatus after transmission of the second signal.

* * * * *